United States Patent
Denis et al.

(10) Patent No.: US 12,013,099 B2
(45) Date of Patent: Jun. 18, 2024

(54) PROJECTING A STATIC LIGHT PATTERN OR SYMBOL

(71) Applicant: Lumileds LLC, San Jose, CA (US)

(72) Inventors: Gregoire Denis, Sunnyvale, CA (US); Rohit Modi, Hayward, CA (US); Benno Spinger, Aachen (DE); Niels Jeroen van der Veen, Geldrop (NL); Parijat Deb, San Jose, CA (US)

(73) Assignee: Lumileds LLC, San Jose, CA (US)

( * ) Notice: Subject to any disclaimer, the term of this patent is extended or adjusted under 35 U.S.C. 154(b) by 0 days.

(21) Appl. No.: 17/991,242

(22) Filed: Nov. 21, 2022

(65) Prior Publication Data

US 2023/0175671 A1   Jun. 8, 2023

Related U.S. Application Data

(60) Provisional application No. 63/285,346, filed on Dec. 2, 2021.

(51) Int. Cl.
*F21V 11/08* (2006.01)
*F21V 5/04* (2006.01)
(Continued)

(52) U.S. Cl.
CPC ............... *F21V 11/08* (2013.01); *F21V 5/04* (2013.01); *F21V 9/30* (2018.02); *F21Y 2115/10* (2016.08)

(58) Field of Classification Search
CPC .......... F21V 11/10; F21V 11/08; F21V 13/10; F21V 13/08; F21V 13/14; F21W 2103/60;
(Continued)

(56) References Cited

U.S. PATENT DOCUMENTS

| 6,208,466 B1 * | 3/2001 | Liu ...................... G02B 5/0252 |
| | | 359/590 |
| 2009/0034284 A1 | 2/2009 | Li et al. |

(Continued)

FOREIGN PATENT DOCUMENTS

| KR | 20140082631 A | 7/2014 |
| KR | 102218927 B1 * | 2/2021 |

OTHER PUBLICATIONS

"International Application Serial No. PCT/US2022/050585, International Search Report mailed Apr. 3, 2023", 4 pgs.

(Continued)

*Primary Examiner* — Erin Kryukova
(74) *Attorney, Agent, or Firm* — Schwegman, Lundberg & Woessner, P.A.

(57) ABSTRACT

A light-emitting diode (LED) can have a light-emitting surface that can emit emitted light. A filter, disposed on the light-emitting surface, can be at least partially transmissive in a first area and at least partially reflective in a second area. The first area can direct at least some of the emitted light through the filter to form shaped light that extends over an area corresponding to a shape of a static light pattern. The second area can reflect at least some of the emitted light into the LED through the light-emitting surface. A lens can bring the shaped light to a focus that has the shape of the static light pattern. To increase a contrast of the focus, an absorber, disposed on the second area of the filter, can absorb emitted light that is transmitted through the second area of the filter.

14 Claims, 4 Drawing Sheets

(51) Int. Cl.
*F21V 9/30* (2018.01)
*F21Y 115/10* (2016.01)

(58) Field of Classification Search
CPC ............. B60Q 2400/50; F21Y 2113/10; F21Y 2113/13; F21Y 2114/10
See application file for complete search history.

(56) References Cited

U.S. PATENT DOCUMENTS

| | | |
|---|---|---|
| 2012/0257386 A1 | 10/2012 | Harbers et al. |
| 2013/0258678 A1* | 10/2013 | Nichols .................. F21V 11/16 |
| | | 101/483 |
| 2015/0124468 A1 | 5/2015 | Reiners |
| 2016/0161668 A1 | 6/2016 | Bierhuizen |
| 2019/0270403 A1* | 9/2019 | Sobecki ................. F21S 43/51 |
| 2020/0041886 A1 | 2/2020 | You et al. |
| 2021/0388964 A1* | 12/2021 | Schadenhofer ......... F21S 43/26 |
| 2022/0120406 A1* | 4/2022 | Woo ........................ F21S 43/20 |
| 2022/0186911 A1* | 6/2022 | Koller ..................... B60Q 3/76 |

OTHER PUBLICATIONS

"International Application Serial No. PCT/US2022/050585, Written Opinion mailed Apr. 3, 2023", 4 pgs.

\* cited by examiner

PROJECTING A STATIC LIGHT PATTERN OR SYMBOL

CROSS-REFERENCE TO RELATED APPLICATION

This application claims the benefit of U.S. Provisional Application No. 63/285,346, filed on Dec. 2, 2021, the entirety of which is hereby incorporated by reference herein.

FIELD OF THE DISCLOSURE

The present disclosure relates to a system and method for projecting a static light pattern, such as a static symbol.

BACKGROUND OF THE DISCLOSURE

An optical system can project light onto a target. There is ongoing effort to improve systems and methods for projecting a static light pattern, such as for projecting a lighted arrow onto a road or projecting a corporate logo onto a side of a building.

BRIEF DESCRIPTION OF THE DRAWINGS

Corresponding reference characters indicate corresponding parts throughout the several views. Elements in the drawings are not necessarily drawn to scale. The configurations shown in the drawings are merely examples and should not be construed as limiting in any manner.

DETAILED DESCRIPTION

In an example, a light-emitting diode (LED) can have a light-emitting surface that can emit emitted light. A filter, disposed on the light-emitting surface, can be at least partially transmissive in a first area and at least partially reflective in a second area. The first area can direct at least some of the emitted light through the filter to form shaped light that extends over an area corresponding to a shape of a static light pattern, such as a static symbol. The second area can reflect at least some of the emitted light into the LED through the light-emitting surface. A lens can bring the shaped light to a focus that has the shape of the static light pattern. To increase a contrast of the focus, an absorber, disposed on the second area of the filter, can absorb emitted light that is transmitted through the second area of the filter.

Compared with a projection system that uses an LED array as its light source, the projection system described herein can have a significantly lower cost and complexity. In addition, compared with a projection system in which the filter is separated from the light-emitting surface of the LED, the projection system described herein can "recycle" at least some of the light that is not used to project the focus, thereby increasing its light output and/or decreasing its energy usage.

Figure 1:
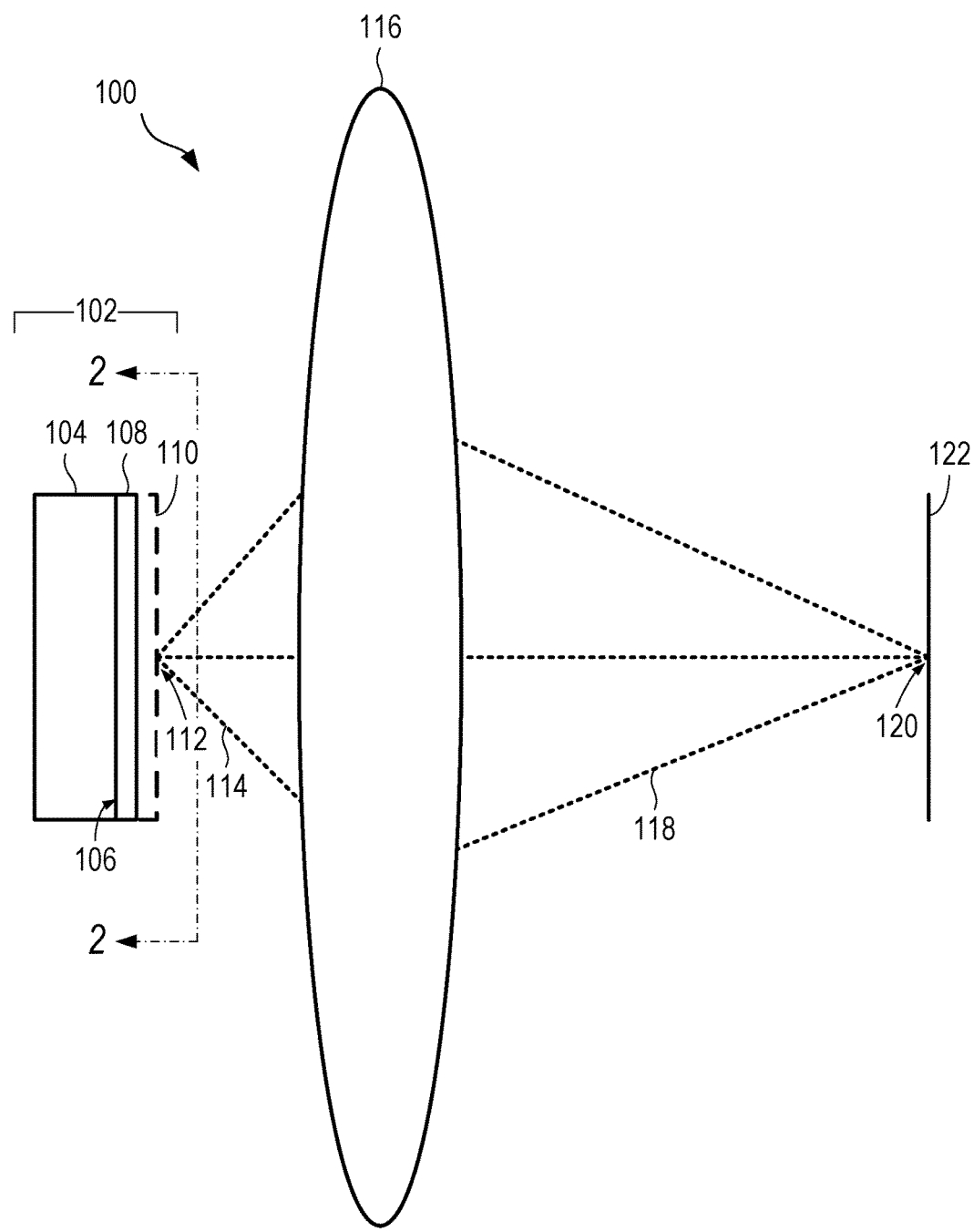
FIG. 1 shows a side view of an example of a projection system, in accordance with some examples.

FIG. 1 shows a side view of an example of a projection system 100, in accordance with some examples. The configuration of FIG. 1 is but one example of a projection system 100; other suitable configurations can also be used.

The projection system 100 can include a light-emitting diode (LED) 102. The LED 102 can include an LED die 104. The LED die 104 can include an interior in which current passes through a p-n junction to produce light.

The LED 102 can have a light-emitting surface 106 that can emit light produced by the LED die 104 as emitted light. In some examples, the LED 102 can include a single light-emitting surface 106, which can be electrically powered by a single electrical signal (not shown). In some examples, the light-emitting surface 106 can be substantially flat. Alternatively, the LED 102 can include multiple light-emitting surfaces.

Figure 2:
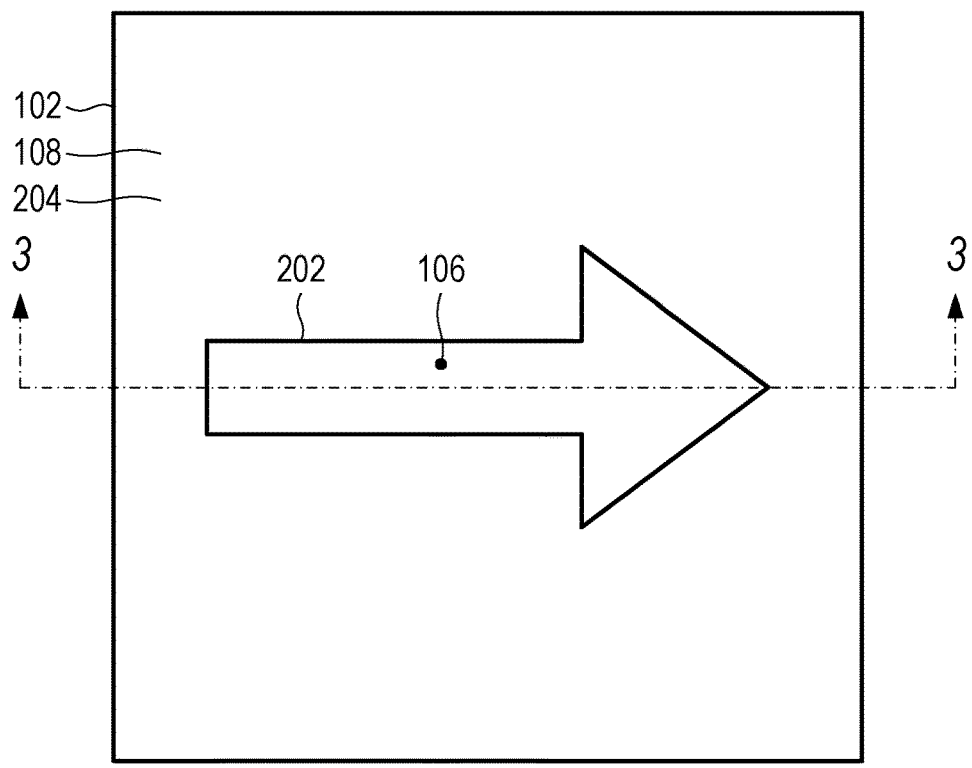
FIG. 2 shows a front view of the light-emitting diode (LED) of FIG. 1, in accordance with some examples.
Figure 3:
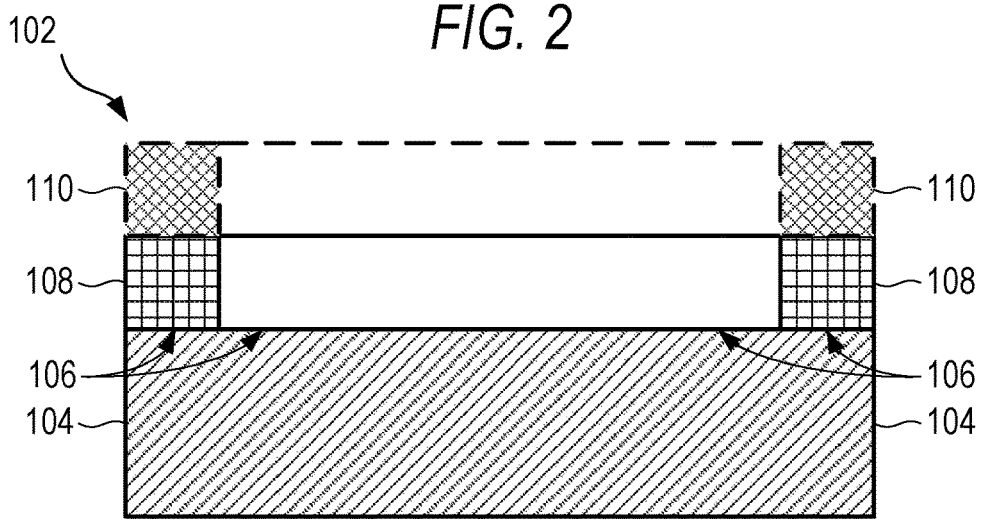
FIG. 3 shows a side-view cross-section of the LED of FIG. 2, in accordance with some examples.
Figure 4:
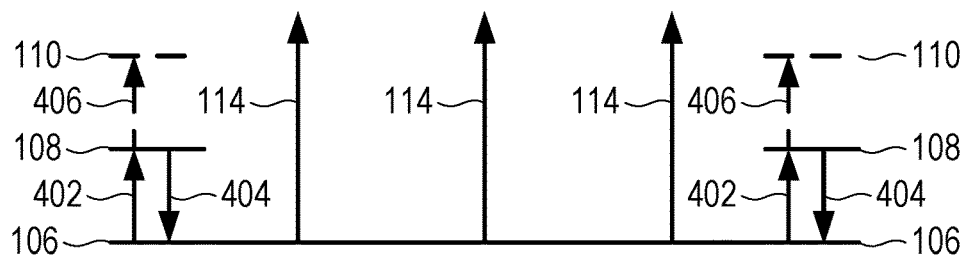
FIG. 4 shows a schematic drawing showing the effects of the filter on light emitted from the LED, in accordance with some examples.

The projection system 100 can include a filter 108 disposed on the light-emitting surface 106. FIG. 2 shows a front view of the LED 102 of FIG. 1, in accordance with some examples. FIG. 3 shows a side-view cross-section of the LED 102 of FIG. 2, in accordance with some examples. FIG. 4 shows a schematic drawing showing the effects of the filter 108 on light emitted from the LED 102, in accordance with some examples.

The filter 108 can be at least partially transmissive in a first area 202 (FIG. 2). The first area 202 can have a shape that corresponds to a shape of a static light pattern, such as a static symbol. In the example of FIG. 2, the static light pattern is shaped as an arrow. Other suitable static light patterns can include a corporate logo, the letters "EXIT", and others. The first area 202 can direct at least some of the emitted light through the filter 108 to form shaped light 114. The shaped light 114 can extend over an area that corresponds to the shape of the static light pattern.

The filter 108 can be at least partially reflective in a second area 204 (FIG. 2). In the example of FIG. 2, the filter 108 can be at least partially reflective in the area surrounding the arrow. The second area 204 can reflect at least some of the emitted light 402 (FIG. 4) into the LED 102 through the light-emitting surface 106. For example, the second area 204 can reflect at least some of the emitted light into the LED die 104, thereby "recycling" light 404 (FIG. 4) that would otherwise be wasted, which can increase a power output of the projection system 100 and/or decrease a power usage of the projection system 100.

In some examples, the filter 108 can include a reflector. For example, the filter 108 can be formed as a reflective layer that is disposed on the light-emitting surface 106, with patterning such that the reflective layer is present in the second area 204 but not the first area 202. The first area 202 of the filter 108 can include at least one aperture that extends through the reflector. In some examples, the reflector can include a dielectric thin film coating. In some examples, the dielectric thin film coating can include alternating layers of at least two dielectric materials having different refractive indices, such as $SiO_2$, $TiO_2$, or others. The alternating layers can have thicknesses selected such that the thin film coating is reflective at a wavelength of the emitted light. In some examples, the reflector can include a metallic coating, such as aluminum, silver, or others.

In some examples, the LED 102 can include a phosphor layer. The LED die 104 can produce first light having a first wavelength, such as in the blue or violet portion of the visible spectrum. The phosphor layer can absorb some or all of the first light and emit second light having a second wavelength that is greater than the first wavelength, such as in the yellow portion of the visible spectrum. The full light output can be the second light, or a combination of the first light and the second light. In some examples, the phosphor and the geometry of the LED die 104 can be tailored to output light having a specified peak wavelength and/or a specified wavelength spectrum. In some examples, the phosphor layer can be disposed between the filter 108 and the light-emitting surface 106. In some examples, the filter 108 can be disposed between the phosphor layer and the light-emitting surface 106. In some examples, the LED 102 can lack a phosphor layer.

The projection system 100 can optionally include an absorber 110 (FIGS. 3 and 4) disposed on the second area 204 of the filter 108. The absorber 110 can absorb any residual light 406 (FIG. 4), such as emitted light that is transmitted through the (at least partially reflective) second area 204 of the filter 108. In practice, the amount of light that is transmitted through the second area 204 of the filter 108 can be relatively small, such as on the order of one percent of the light that strikes the filter 108. Including the absorber 110 to absorb this residual light 406 can increase a contrast of the projected static light pattern, such as by making a dark area of the projected static light pattern even darker.

Returning to FIG. 1, the projection system 100 can include a lens 116. The lens 116 can bring the shaped light 114 to a focus that has the shape of the static light pattern. For example, in the example of FIG. 1, the lens 116 can redirect rays emerging from a location 112 on the LED 102 to form rays 118 that converge to a corresponding location 120 on a target 122, such as a screen, a wall, a road, or others. The lens 116 can redirect light from other locations in the static light pattern to other corresponding location at the target 122. For the example of FIG. 2, in which the static light pattern is an arrow, the LED 102 can form an image of the arrow at the target 122.

In some examples, such as when the LED 102 includes a phosphor layer, the focus can include white light, such as light having a relatively broad spectrum and being perceived by the human eye as white light or nearly white light. In other examples, the LED 102 can lack a phosphor layer, and can produce light having a relatively narrow spectrum, such as red light, green light, blue light, or other single-color lights.

To produce color or pseudo-color in the projected light pattern, the projection system 100 can include multiple LEDs 102, multiple filters 108, and multiple lenses 116, which can project multiple static light patterns that combine to produce a single multiple-color static light pattern. For example, a red LED, a green LED, and a blue LED (along with corresponding filters and lenses) can produce a single full-color static light pattern. These are but examples, and other configurations can also be used.

Similarly, the multiple LEDs 102, multiple filters 108, and multiple lenses 116 (referred to below as "optical elements") can be modulated in time, so that one or more elements of a static light pattern can blink or appear sequentially. For example, a first set of optical elements can produce a pattern of the letters "EAT", a second set of optical elements can produce a pattern of the letters "AT", and a third set of optical elements can produce a pattern of the letters "JOE'S". These are but examples, and other configurations can also be used. A controller (not shown) can include a processor and memory that includes instructions that, when executed by the processor, can cause the processor to modulate the multiple LEDs 102, multiple filters 108, multiple lenses 116, and other optical elements in time.

Figure 5:
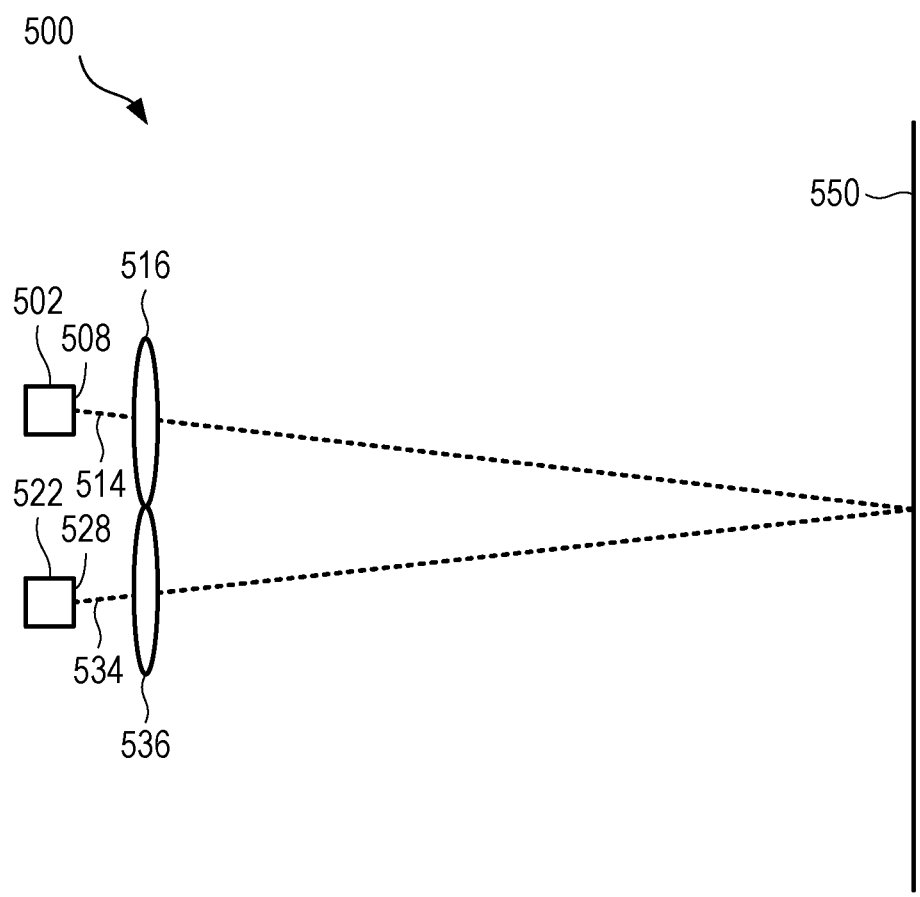
FIG. 5 shows a side view of an example of a projection system, in accordance with some examples.

FIG. 5 shows a side view of an example of a projection system 500, in accordance with some examples. The projection system 500 can include multiple sets of optical elements, which can produce respective portions of the static light pattern that can combine at a screen 550 or target. The portions can combine in wavelength or color, and/or can be modulated in time, such as by blinking.

In a specific example, the LED 102 (FIG. 1) can be a first LED 502. The light-emitting surface 106 can be a first light-emitting surface. The static light pattern can be a first static light pattern. The emitted light can be first emitted light having a first wavelength. The filter 108 (FIG. 1) can be a first filter 508. The shaped light 114 (FIG. 1) can be first shaped light 514. The lens 116 (FIG. 1) can be a first lens 516. The focus can be a first focus. The projection system 100 can further include a second LED 522 having a second light-emitting surface that can emit second emitted light having a second wavelength that is optionally different from the first wavelength. The projection system 500 can further include a second filter 528 disposed on the second light-emitting surface. The second filter 528 can be at least partially transmissive in a third area. The third area can have a shape that corresponds to a shape of a second static light pattern. The third area can direct at least some of the second emitted light through the second filter to form second shaped light 534. The second shaped light can extend over an area that corresponds to the shape of the second static light pattern. The second filter 528 can be at least partially reflective in a fourth area. The fourth area can reflect at least some of the second emitted light into the second LED 522 through the second light-emitting surface. The projection system 500 can further include a second lens 536 that can bring the second shaped light 534 to a second focus that has the shape of the second static light pattern. In some examples, the second focus can at least partially overlap with the first focus, such as at the screen 550 or target. In some examples, the second focus may not overlap with the first focus.

In some examples, any or all of lenses 116, 516, or 536 can optionally be formed as multi-element lenses. For example, lens 516 can include a first lens element followed sequentially by a second lens element. Separating a lens into multiple elements can help ease manufacturing and alignment tolerances on the lens elements.

In the configurations of FIGS. 1-5, the filter 108 can be disposed on the light-emitting surface 106 of the LED die 104. As an alternative, the filter 108 can be separate from the LED 102 and located relatively close to the LED 102. For example, the filter 108 can be disposed on a transparent substrate that is located relatively close to the LED 102. The filter 108 can include one or more reflective portions that reflect light back into the LED 102. As a separation between the substrate and the LED 102 decreases, an efficiency of the reflections increases, such as by reducing an amount of light that reflects from the filter 108 but leaks out of a periphery of the LED 102 and therefore does not re-enter the LED 102. Other configurations can also be used.

Figure 6:
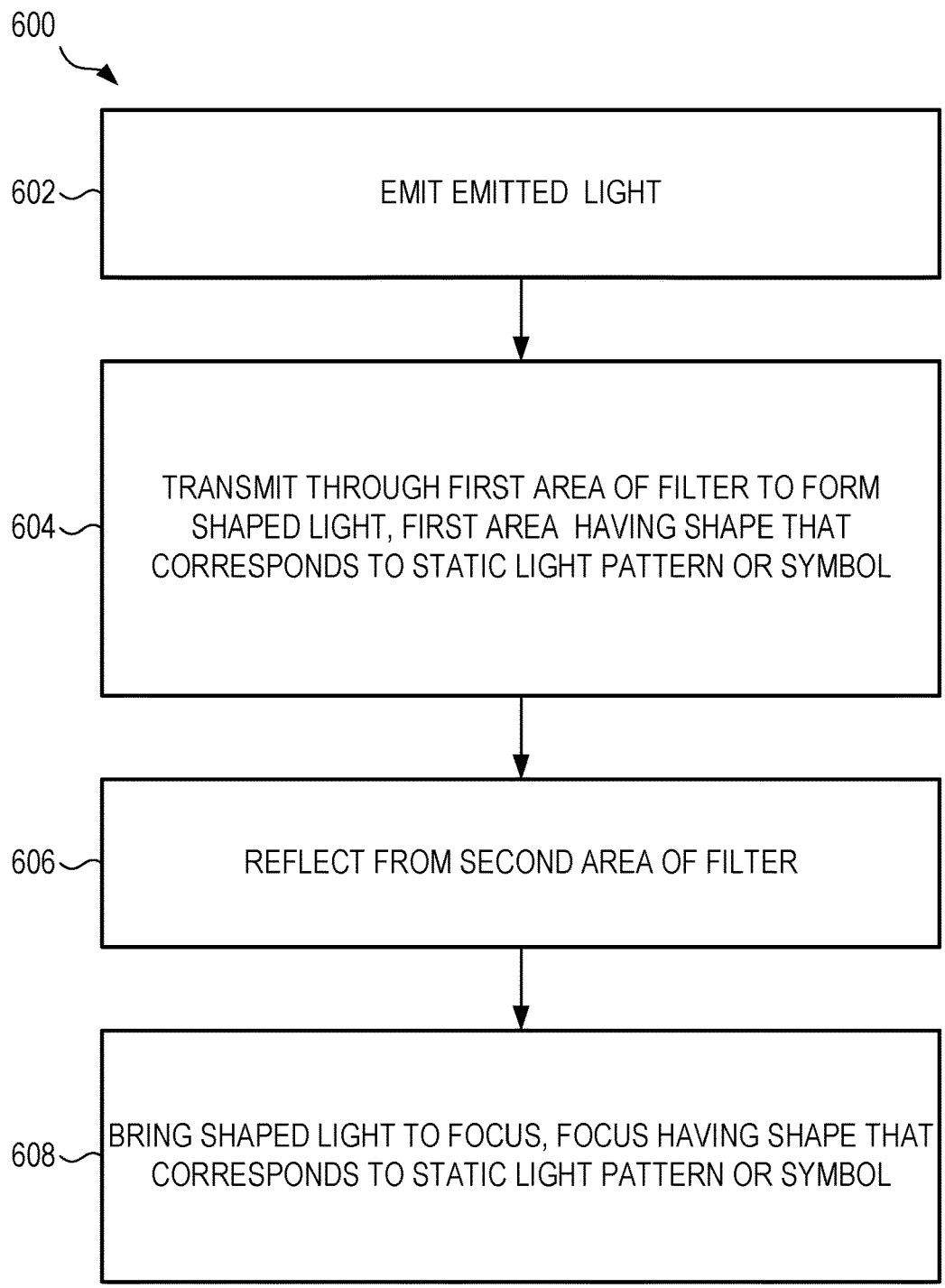
FIG. 6 shows a flowchart of an example of a method for projecting a static light pattern, in accordance with some examples.

FIG. 6 shows a flowchart of an example of a method 600 for projecting a static light pattern, in accordance with some examples. The method 600 can be executed by projection system 100, projection system 500, or another suitable system. The method 600 for projecting a static light pattern is but one method for projecting a static light pattern; other suitable methods can also be used.

At operation 602, a light-emitting surface of an LED can emit emitted light.

At operation 604, at least some of the emitted light can be transmitted through a first area of a filter disposed on the light-emitting surface to form shaped light. The first area can have a shape that corresponds to a shape of a static light pattern.

At operation 606, a second area of the filter can reflect at least some of the emitted light into the LED through the light-emitting surface.

At operation 608, a lens can bring the shaped light to a focus that has the shape of the static light pattern.

In some examples, the filter can include a reflector. The first area of the filter can include at least one aperture that extends through the reflector.

In some examples, the method can optionally include absorbing, with an absorber disposed on the second area of the filter, emitted light that is transmitted through the second area of the filter.

To further illustrate the systems and related methods disclosed herein, a non-limiting list of examples is provided below. Each of the following non-limiting examples can stand on its own or can be combined in any permutation or combination with any one or more of the other examples.

In Example 1, a projection system can include: a light-emitting diode (LED) having a light-emitting surface configured to emit emitted light; a filter disposed on the light-emitting surface, the filter being at least partially transmissive in a first area, the first area having a shape that corresponds to a shape of a static light pattern, the first area configured to direct at least some of the emitted light through the filter to form shaped light, the shaped light extending over an area that corresponds to the shape of the static light pattern, the filter being at least partially reflective in a second area, the second area configured to reflect at least some of the emitted light into the LED through the light-emitting surface; and a lens configured to bring the shaped light to a focus that has the shape of the static light pattern.

In Example 2, the projection system of Example 1 can optionally be configured such that the light-emitting surface is substantially flat.

In Example 3, the projection system of any one of Examples 1-2 can optionally be configured such that the filter comprises a reflector, the first area of the filter comprising at least one aperture that extends through the reflector.

In Example 4, the projection system of any one of Examples 1-3 can optionally be configured such that the reflector comprises a dielectric thin film coating.

In Example 5, the projection system of any one of Examples 1-4 can optionally be configured such that the dielectric thin film coating includes alternating layers of at least two dielectric materials having different refractive indices, the alternating layers having thicknesses selected such that the thin film coating is reflective at a wavelength of the emitted light.

In Example 6, the projection system of any one of Examples 1-5 can optionally be configured such that the reflector comprises a metallic coating.

In Example 7, the projection system of any one of Examples 1-6 can optionally further include an absorber disposed on the second area of the filter, the absorber configured to absorb emitted light that is transmitted through the second area of the filter.

In Example 8, the projection system of any one of Examples 1-7 can optionally be configured such that: the LED includes a phosphor layer; and the focus includes white light.

In Example 9, the projection system of any one of Examples 1-8 can optionally be configured such that the phosphor layer is disposed between the filter and the light-emitting surface.

In Example 10, the projection system of any one of Examples 1-9 can optionally be configured such that the filter is disposed between the phosphor layer and the light-emitting surface.

In Example 11, the projection system of any one of Examples 1-10 can optionally be configured such that the LED lacks a phosphor layer.

In Example 12, the projection system of any one of Examples 1-11 can optionally be configured such that: the LED is a first LED; the light-emitting surface is a first light-emitting surface; the static light pattern is a first static light pattern; the emitted light is first emitted light having a first wavelength; the filter is a first filter; the shaped light is first shaped light; the lens is a first lens; the focus is a first focus; and the projection system further comprises: a second LED having a second light-emitting surface configured to emit second emitted light having a second wavelength different from the first wavelength; a second filter disposed on the second light-emitting surface, the second filter being at least partially transmissive in a third area, the third area having a shape that corresponds to a shape of a second static light pattern, the third area configured to direct at least some of the second emitted light through the second filter to form second shaped light, the second shaped light extending over an area that corresponds to the shape of the second static light pattern, the second filter being at least partially reflective in a fourth area, the fourth area configured to reflect at least some of the second emitted light into the second LED through the second light-emitting surface; and a second lens configured to bring the second shaped light to a second focus that has the shape of the second static light pattern.

In Example 13, the projection system of any one of Examples 1-12 can optionally be configured such that the second focus at least partially overlaps with the first focus.

In Example 14, a method for projecting a static light pattern can include: emitting emitted light from a light-emitting surface of a light-emitting diode (LED); transmitting at least some of the emitted light through a first area of a filter disposed on the light-emitting surface to form shaped light, the first area having a shape that corresponds to a shape of a static light pattern; reflecting, from a second area of the filter, at least some of the emitted light into the LED through the light-emitting surface; and bringing, with a lens, the shaped light to a focus that has the shape of the static light pattern.

In Example 15, the method of Example 14 can optionally be configured such that the filter comprises a reflector, the first area of the filter comprising at least one aperture that extends through the reflector.

In Example 16, the method of any one of Examples 14-15 can optionally further include: absorbing, with an absorber disposed on the second area of the filter, emitted light that is transmitted through the second area of the filter.

In Example 17, a projection system can include: a light-emitting diode (LED) having a substantially flat light-emitting surface configured to emit emitted light; a reflector disposed on the light-emitting surface, the reflector having at least one aperture that extends through the reflector in a first area, the first area having a shape that corresponds to a shape of a static light pattern, the first area configured to direct at least some of the emitted light through the reflector to form shaped light, the shaped light extending over an area that corresponds to the shape of the static light pattern, the reflector being at least partially reflective in a second area, the second area configured to reflect at least some of the emitted light into the LED through the light-emitting surface; a lens configured to bring the shaped light to a focus that has the shape of the static light pattern; and an absorber disposed on the second area of the reflector, the absorber configured to absorb emitted light that is transmitted through the second area of the reflector.

In Example 18, the projection system of Example 17 can optionally be configured such that the reflector comprises a dielectric thin film coating.

In Example 19, the projection system of any one of Examples 17-18 can optionally be configured such that the dielectric thin film coating includes alternating layers of at least two dielectric materials having different refractive indices, the alternating layers having thicknesses selected such that the thin film coating is reflective at a wavelength of the emitted light.

In Example 20, the projection system of any one of Examples 17-19 can optionally be configured such that the reflector comprises a metallic coating.

While only certain features of the system and method have been illustrated and described herein, many modifications and changes will occur to those skilled in the art. It is, therefore, to be understood that the appended claims are intended to cover all such modifications and changes. Method operations can be performed substantially simultaneously or in a different order.

What is claimed is:

1. A projection system, comprising:
   a first light-emitting diode (LED) lacking a phosphor layer and having a first light-emitting surface configured to emit first emitted light having a first wavelength;
   a first filter disposed on the first light-emitting surface,
   the first filter being at least partially transmissive in a first area, the first area having a shape that corresponds to a shape of a first static light pattern, the first area configured to direct at least some of the first emitted light through the first filter to form first shaped light, the first shaped light extending over an area that corresponds to the shape of the first static light pattern,
   the first filter being at least partially reflective in a second area, the second area configured to reflect at least some of the first emitted light into the first LED through the first light-emitting surface;
   a first lens configured to bring the first shaped light to a first focus that has the shape of the first static light pattern;
   a second LED lacking a phosphor layer and having a second light-emitting surface configured to emit second emitted light having a second wavelength different from the first wavelength;
   a second filter disposed on the second light-emitting surface,
   the second filter being at least partially transmissive in a third area, the third area having a shape that corresponds to a shape of a second static light pattern, the third area configured to direct at least some of the second emitted light through the second filter to form second shaped light, the second shaped light extending over an area that corresponds to the shape of the second static light pattern,
   the second filter being at least partially reflective in a fourth area, the fourth area configured to reflect at least some of the second emitted light into the second LED through the second light-emitting surface; and
   a second lens configured to bring the second shaped light to a second focus that has the shape of the second static light pattern and at least partially overlaps with the first focus.

2. The projection system of claim 1, wherein the first light-emitting surface is substantially flat.

3. The projection system of claim 1, wherein the first filter comprises a reflector, the first area of the first filter comprising at least one aperture that extends through the reflector.

4. The projection system of claim 3, wherein the reflector comprises a dielectric thin film coating.

5. The projection system of claim 4, wherein the dielectric thin film coating is reflective at the first wavelength.

6. The projection system of claim 3, wherein the reflector comprises a metallic coating.

7. The projection system of claim 1, further comprising an absorber disposed on the second area of the first filter, the absorber configured to absorb emitted light that is transmitted through the second area of the first filter.

8. A method for projecting a static light pattern, the method comprising:
   emitting first emitted light having a first wavelength from a first light-emitting surface of a first light-emitting diode (LED);
   transmitting at least some of the first emitted light through a first area of a first filter disposed on the first light-emitting surface to form first shaped light, the first area having a shape that corresponds to a shape of a first static light pattern;
   reflecting, from a second area of the first filter, at least some of the first emitted light into the first LED through the first light-emitting surface;
   bringing, with a first lens, the first shaped light to a first focus that has the shape of the first static light pattern;
   emitting second emitted light having a second wavelength different from the first wavelength from a second light-emitting surface of a second LED;
   transmitting at least some of the second emitted light through a third area of a second filter disposed on the second light-emitting surface to form second shaped light, the third area having a shape that corresponds to a shape of a second static light pattern;
   reflecting, from a fourth area of the second filter, at least some of the second emitted light into the second LED through the second light-emitting surface; and
   bringing, with a second lens, the second shaped light to a second focus that has the shape of the second static light pattern and at least partially overlaps with the first focus.

9. The method of claim 8, wherein the first filter comprises a reflector, the first area of the first filter comprising at least one aperture that extends through the reflector.

10. The method of claim 8, further comprising:
    absorbing, with an absorber disposed on the second area of the first filter, first emitted light that is transmitted through the second area of the first filter.

11. A projection system, comprising:
    a first light-emitting diode (LED) having a substantially flat first light-emitting surface configured to emit first emitted light having a first wavelength;
    a first reflector disposed on the first light-emitting surface, the first reflector having at least one aperture that extends through the first reflector in a first area, the first area having a shape that corresponds to a shape of a first static light pattern, the first area configured to direct at least some of the first emitted light through the first reflector to form first shaped light, the first shaped light extending over an area that corresponds to the shape of the first static light pattern, the first reflector being at least partially reflective in a second area, the second area configured to reflect at least some of the first emitted light into the first LED through the first light- emitting surface;

a first lens configured to bring the first shaped light to a first focus that has the shape of the first static light pattern;

a first absorber disposed on the second area of the first reflector, the first absorber configured to absorb first emitted light that is transmitted through the second area of the first reflector;

a second light-emitting diode (LED) having a substantially flat second light-emitting surface configured to emit second emitted light having a second wavelength different from the first wavelength;

a second reflector disposed on the second light-emitting surface, the second reflector having at least one aperture that extends through the second reflector in a third area, the third area having a shape that corresponds to a shape of a second static light pattern, the third area configured to direct at least some of the second emitted light through the second reflector to form second shaped light, the second shaped light extending over an area that corresponds to the shape of the second static light pattern, the second reflector being at least partially reflective in a fourth area, the fourth area configured to reflect at least some of the second emitted light into the second LED through the second light-emitting surface;

a second lens configured to bring the second shaped light to a second focus that has the shape of the second static light pattern and at least partially overlaps with the first focus; and a second absorber disposed on the fourth area of the second reflector, the second absorber configured to absorb second emitted light that is transmitted through the fourth area of the second reflector.

12. The projection system of claim 11, wherein the first reflector comprises a dielectric thin film coating.

13. The projection system of claim 12, wherein the dielectric thin film coating is reflective at the first wavelength.

14. The projection system of claim 11, wherein the first reflector comprises a metallic coating.

* * * * *

UNITED STATES PATENT AND TRADEMARK OFFICE
CERTIFICATE OF CORRECTION

| | |
|---|---|
| PATENT NO. | : 12,013,099 B2 |
| APPLICATION NO. | : 17/991242 |
| DATED | : June 18, 2024 |
| INVENTOR(S) | : Denis et al. |

It is certified that error appears in the above-identified patent and that said Letters Patent is hereby corrected as shown below:

In the Claims

In Column 8, Line 4, in Claim 1, delete "light- emitting" and insert --light-emitting-- therefor In Column 9, Line 12, in Claim 11, delete "light- emitting" and insert --light-emitting-- therefor Signed and Sealed this
Twentieth Day of August, 2024

Katherine Kelly Vidal
*Director of the United States Patent and Trademark Office*